United States Patent Office 3,484,443
Patented Dec. 16, 1969

---

3,484,443
HYDROXY- AND METHOXY HEXAHYDRO-BENZO[b]QUINOLIZINES
Jeffrey W. H. Watthey, 32 Charter Circle, and Karl J. Doebel, 18 Orchard Drive, both of Ossining, N.Y. 10562
No Drawing. Filed Nov. 7, 1967, Ser. No. 681,078
Int. Cl. C07d 33/38
U.S. Cl. 260—289                                11 Claims

ABSTRACT OF THE DISCLOSURE

The compounds are of the class of hexahydrobenzo[b]quinolizines, more particularly hexahydrobenzo[b]quinolizines substituted in the 7,8,9 and 10 positions by hydroxy, lower alkyl, lower alkoxy, or lower alkanoyloxy groups, and acid addition salts thereof. The compounds are useful as cardiovascular agents and agents affecting the central nervous system (CNS). Illustrative embodiments are 9,10-dihydroxy-7-methyl-1,3,4,6,11,11a-hexahydrobenzo[b]quinolizine and 8,9,10-trimethoxy-1,3,4,6,11,11a-hexahydrobenzo[b]quinolizine.

BACKGROUND OF THE DISCLOSURE

Field of the disclosure

The present invention relates to compounds which may be characterized by the following Formula I

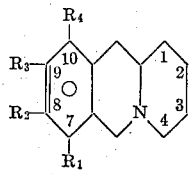

(I)

wherein $R_1$ is hydrogen, lower alkyl, hydroxy, lower alkoxy, or lower alkanoyloxy;

$R_2$ is hydrogen, hydroxy, lower alkoxy, or lower alkanoyloxy;

$R_3$ is hydrogen, hydroxy, lower alkoxy, or lower alkanoyloxy; and $R_4$ is hydrogen, hydroxy, lower alkoxy, or lower alkanoyloxy, with the proviso that if $R_1$ is hydrogen, $R_4$ must be hydroxy, lower alkoxy or alkanoyloxy, and pharmaceutically acceptable acid addition salts thereof.

Furthermore, the present invention relates to novel methods and compositions containing a compound of the above-mentioned formula for effecting cardiovascular, particularly hypotensive, activity and CNS, particularly CNS-stimulating and depressing activity in warm-blooded animals, especially mammals. More particularly, the method of effecting cardiovascular and CNS-stimulating activities in mammals is concerned with administering a compound as defined in the above formula in therapeutic doses.

Description of prior art

C. Tani and K. Ishibashi: J. Pharm. Soc. Japan 76, 1064 (1956) describe 8,9-dimethoxy-1,3,4,6,11,11a-hexahydrobenzo[b]quinolizine and 8,9-dihydroxy-1,3,4,6,11,11a-hexahydrobenzo[b]quinolizine hydrobromide; C. K. Bradsher and N. L. Yarrington: J. Org. Chem. 25, 294 (1960) describe 8-hydroxy and 8-methoxy-1,3,4,6,11,11a-hexahydrobenzo[b]quinolizines and the unsubstituted compound. J. R. Flouret discloses in his Ph.D. Thesis at the University of Wisconsin in 1963, on page 58, 9-hydroxy-1,3,4,6,11,11a-hexahydrobenzo[b]quinolizine.

None of the prior art compounds is described as having cardiovascular or CNS activities.

DETAILED DESCRIPTION OF THE DISCLOSURE

The compounds of the present invention correspond to the general formula

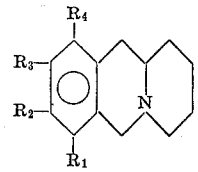

wherein $R_1$ is hydrogen, lower alkyl, hydroxy, lower alkoxy, or lower alkanoyloxy;

$R_2$ is hydrogen, hydroxy, lower alkoxy, or lower alkanoyloxy;

$R_3$ is hydrogen, hydroxy, lower alkoxy, or lower alkanoyloxy; and $R_4$ is hydrogen, hydroxy, lower alkoxy, or lower alkanoyloxy;

with the proviso that, if $R_1$ is hydrogen, $R_4$ must be hydroxy, lower alkoxy, or lower alkanoyloxy; and pharmaceutically acceptable acid addition salts thereof.

According to this invention the scope of the substituents as defined in the above-mentioned formula may be characterized as follows:

The term "lower alkyl" as used herein alone or in "lower alkoxy" and "lower alkanoyloxy" means straight or branched alkyl chains of the general formula $$C_mH_{2M+1}$$

wherein $m$ represents an integer of 5 or less. Illustrative of such alkyl groups are methyl, ethyl, propyl, isopropyl, butyl, and the like; illustrative of alkoxy groups are methoxy, ethoxy, propoxy, iso-propoxy, butoxy, isobutoxy, amyloxy, iso-amyloxy, and the like; illustrative embodiments of alkanoyloxy groups are acetoxy, propionoxy, butyroxy and the like.

The term "pharmaceutically-acceptable acid addition salts" when used herein and in the appended claims signifies those derived from organic and inorganic acids. Illustrative of the acids which form pharmaceutically-acceptable addition salts with the instantly claimed compounds are, for example, hydrochloric, hydrobromic sulfuric, phosphoric, methanesulfonic, acetic, lactic, succinic, malic, aconitic, phthalic, tartaric, pamoic, and the like.

The hexahydrobenzo[b]quinolizines of the above-described formula may be prepared by catalytic hydrogenation of substituted benzo[b]quinolizinium compounds of Formula II

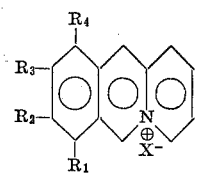

(II)

wherein $R_1$, $R_2$, $R_3$, and $R_4$, have the same meaning as defined above, and may be converted to the acid addition salts by reacting the hexahydrobenzo[b]quinolizines with a pharmaceutically acceptable acid.

The hexahydrobenzo[b]quinolizines of Formula I which are substituted by hydroxy-groups on the benzene may also be obtained by acid hydrolysis of alkoxy-substituted hexahydrobenzo[b]quinolizines. The hexahydrobenzo[b]quinolizines of Formula I which are substituted by alkanoyloxy-groups on the benzene ring may also be obtained by acylation of the hydroxy-substituted hexahydrobenzo[b]quinolizines.

Benzo[b]quinolizinium derivatives of Formula III

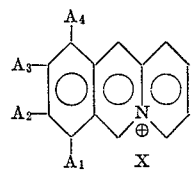   (III)

wherein $A_1$ is hydrogen, lower alkyl or lower alkoxy
$A_2$ is hydrogen or lower alkoxy
$A_3$ is hydrogen or lower alkoxy
$A_4$ is hydrogen or lower alkoxy
and X is halogen, preferably bromine or chlorine used herein as starting materials may be conveniently prepared from benzyl halides of structure IV wherein

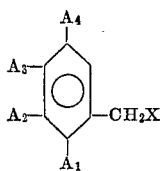   IV $A_1$, $A_2$, $A_3$, $A_4$, and X have the same meaning as defined above.

This compound is then quaternized with a 2-pyridinealdoxime to yield a salt consisting of a mixture of syn and anti isomers, having the following structure:

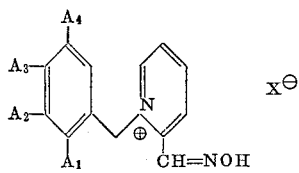

in which $A_1$, $A_2$, $A_3$, $A_4$, and X, have the meanings ascribed to them in the above formula.

Compounds of Formula IV can be made in turn by methods well known in the art from the corresponding aldehydes, carboxylic acids, esters and alcohols, or by the known method of halomethylation of the appropriate benzene derivatives.

An example for the preparation of the starting material is given in the experimental part of this application.

Alternatively, the compounds of the instant invention may be prepared by reacting a substituted benzyl halide with a pipecolinic ester, hydrolyzing the resulting N-benzylpipecolinic ester to the acid, cyclizing the acid to the 11-keto-1,3,4,6,11,11a-hexahydrobenzo[b]quinolizine, and removing the keto function by a method such as desulfurization of the dithioketal or by Wolff-Kishner reduction.

The procedure may be illustrated by the following scheme.

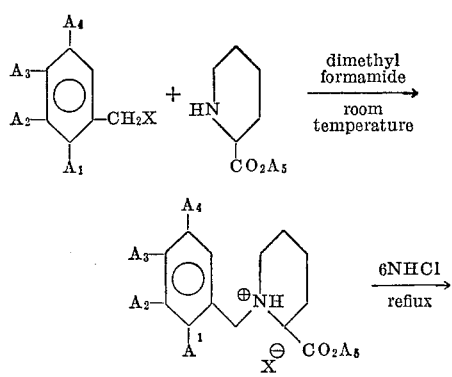

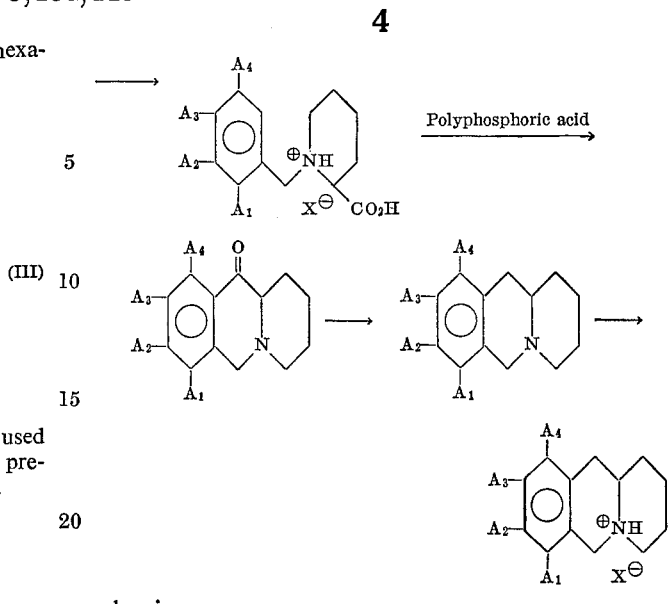

wherein $A_1$, $A_2$, $A_3$, and $A_4$, have the same meaning as defined above,
$A_5$ is lower alkyl and
X is a halogen, preferably chlorine or bromine.

Conversion of the alkoxy-compounds described above to hydroxy- or acyloxy-derivatives may be performed at any convenient stage in the synthesis.

A further way of preparing the compounds of the instant invention involves the conversion of a 3-carboalkoxy-1,2,3,4-tetrahydroisoquinoline to the ---ω-carboalkoxypropyl-derivative, cyclizing the latter to the β-ketoester, converting this material to the 1-keto-1,3,4,6,11,11a-hexahydrobenzo[b]quinolizine and removing the ketofunction by a method such as the desulfurization of the dithioketal or by Wolff-Kishner reduction.

The procedure may be illustrated by the following scheme:

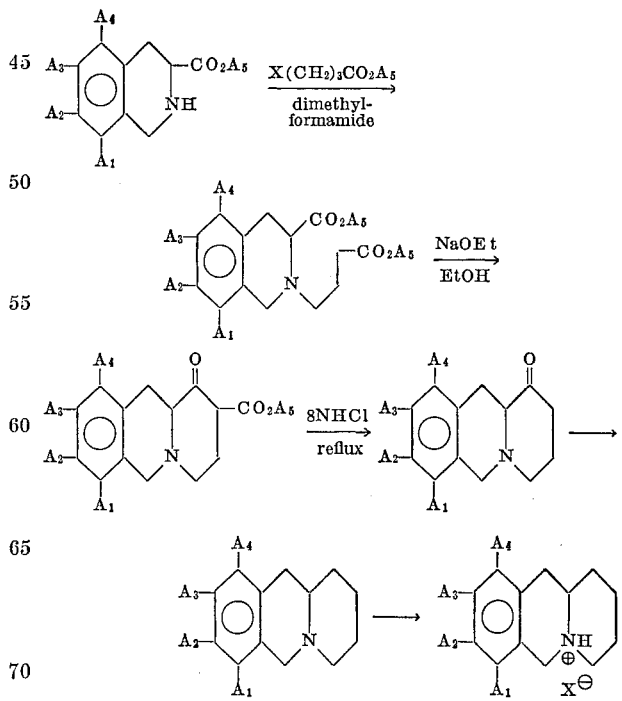

wherein $A_1$, $A_2$, $A_3$, $A_4$, $A_5$ and X have the same meaning as defined above.

Conversion of the alkoxy-compounds described above to hydroxy- or acyloxy-derivatives may be performed at any convenient step in the synthesis.

As pointed out above, the compounds of the present invention, i.e. compounds of the above-described general formula and their physiologically tolerable acid addition salts possess valuable pharmacological and therapeutic properties and may be used in the form of pharmaceutical compositions, especially as cardiovascular, particularly hypotensive, and CNS active, particularly CNS stimulating and depressing agents. It is of special interest that the compounds having alkoxy groups in the unsaturated ring are particularly valuable hypotensive agents and especially those wherein $R_1$ is hydrogen, lower alkyl, or lower alkoxy, and $R_2$, $R_3$, and $R_4$, are hydrogen or lower alkoxy, at least two of $R_1$, $R_2$, $R_3$, and $R_4$, being adjacent lower alkoxy groups with the proviso that if $R_1$ is hydrogen, $R_4$ is lower alkoxy.

Good CNS active properties were found for compounds wherein $R_1$ is hydrogen, hydroxy, or lower alkyl and $R_2$, $R_3$, and $R_4$ are hydrogen or hydroxy, at least two of $R_1$, $R_2$, $R_3$, and $R_4$ being adjacent hydroxy groups, with the proviso that if $R_1$ is hydrogen, $R_4$ is hydroxy; and for compounds wherein $R_1$ is hydrogen, lower alkyl, or lower alkanoyloxy, $R_2$, $R_3$, and $R_4$ are hydrogen or lower alkanoyloxy, at least two of $R_1$, $R_2$, $R_3$, and $R_4$ being adjacent lower alkanoyloxy groups, with the proviso that if $R_1$ is hydrogen, $R_4$ is lower alkanoyloxy.

The toxicity of the compounds of the instant invention is low; for instance, the $LD_{50}$ of 9,10-dihydroxy-7-isopropyl - 1,3,4,6,11,11a-hexahydrobenzo[b]quinolizine hydrobromide administered orally to mice is approximately 250 mg./kg. In the case of 9,10-dihydroxy-7-methyl-1,3,4,6,11,11a - hexahydrobenzo[b]quinolizine hydrobromide, no deaths were observed when the substance was administered orally to mice at doses up to 1250 mg./kg.

The cardiovascular activity was studied in the intact anesthetized cat, as follows:

The compounds of the invention may be used in warm-blooded animals, particularly mammals, as medicaments in the form of pharmaceutical compositions containing the compounds in admixture or conjunction with a pharmaceutical organic or inorganic, solid or liquid carrier for oral, rectal, or parenteral administration. The total daily doses can vary from about 0.1 mg./kg., to about 10 mg./kg. preferably about 0.5 mg./kg. to 5 mg./kg.

The preferred route of administration is the oral route. Suitable compositions include, without limitation, tablets, capsules, powders, solutions, suspensions, sustained release formulations and the like.

To produce dosage units for peroral application, the compositions of this invention may be combined, e.g. with solid pharmaceutically acceptable pulverulent carriers such as lactose, saccharose, sorbitol, mannitol; starches such as potato starch, corn starch or amylopectin, also laminaria powder or citrus pulp powder, cellulose derivatives or gelatin, also lubricants such as magnesium or calcium stearate or polyethylene glycols (Carbowaxes) of suitable molecular weights may be added, to form tablets or press coated tablets. The latter are coated for example, with concentrated sugar solutions which can contain e.g. gum arabic, talcum and/or titanium dioxide, or they are coated with lacquer dissolved in easily volatile organic solvents or a mixture of organic solvents. Dyestuffs can be added to these coatings, for example, to distinguish between different contents of active substances.

Hard gelatin capsules contain, for example, granulates of the instant composition with solid pulverulent carriers such as e.g. lactose, saccharose, sorbitol, mannitol and further starches such as potato starch, corn starch or amylopectin, cellulose derivatives or gelatin, as well as magnesium stearate or stearic acid.

Suppositories containing a compound of the present invention are reaadily obtained by techniques well known to those skilled in the art of compounding dosage forms. A compound of the present invention is dispersed in a

| Compound administered | Dose mg./kg. | Route, intravenous or intraduodenal | Blood pressure | | Duration of hypotension |
|---|---|---|---|---|---|
| | | | Control | Response (maximum) | |
| 8,9-dimethoxy-7-methyl-1,3,4,6,11,11a-hexahydrobenzo[b]quinolizine | 3 | I.V. | 100/48 | 75/33 | 20+ min. |
| | 3 | I.V. | 130/80 | 95/60 | 15+ min. |
| 8,9,10-trimethoxy-1,3,4,6,11,11a-hexahydrobenzo[b]quinolizine | 10 | I.V. | 125/80 | 70/55 | 17+ min. |
| | 30 | D.U. | 145/58 | [1] 110/38 | >90 min. |
| 9,10-dimethoxy-7-isopropyl-1,3,4,6,11,11a-hexahydrobenzo[b]quinolizine | 3 | I.V. | 115/65 | 80/45 | 0.6 min. |
| 7,10-dimethoxy-1,3,4,6,11,11a-hexahydrobenzo[b]quinolizine | 3 | I.V. | 150/70 | 100/55 | 1 min. |

[1] Blood pressure reading 90 minutes after administration of the substance.

As indicated in the foregoing table, administration of the compounds of the invention causes a significant lowering of blood pressure as shown under "response."

The compounds of the present invention possess CNS-stimulating or depressing activity as demonstrated by locomotor activity in the mouse. Thirty minutes after intraperitoneal dosing (in a volume of 0.1 ml./g. of mouse) the mice were placed in circular activity cages, 2 animals per cage. Each cage contained six radial photoelectric beams. Every time a beam was broken a "count" was registered in an appropriate digital counter. Locomotor activity was then recorded for two hours. The results are expressed as percent of control counts.

carrier such as cocoa butter and the suppositories formed in the usual way.

The following examples are given by way of illustrating the process for the preparation of the compounds and the compositions without limiting the scope thereof in any way. The temperatures are given in degrees centigrade.

EXAMPLE 1

8,9-dimethoxy-7-methyl-1,3,4,6,11,11a-hexahydrobenzo[b]quinolizine (a) 8,9 - dimethoxy - 7 - methylbenzo[b]quinolizinium bromide (5 g.) was dissolved in a mixture of glacial acetic

| Compound administered | Dose, mg./kg. | Percent Control Counts |
|---|---|---|
| 8,9-dimethoxy-7-methyl-1,3,4,6,11,11a-hexahydrobenzo[b]quinolizine | 50 | 210 |
| | 100 | 499 |
| 8,9-dihydroxy-7-methyl-1,3,4,6,11,11a-hexahydrobenzo[b] quinolizine hydrobromide | 256 | 123 |
| 9,10-dihydroxy-7-methyl-1,3,4,6,11,11a-hexahydrobenzo[b]quinolizine hydrobromide | 100 | 40 |
| 8,9,10-trimethoxy-1,3,4,6,11,11a-hexahydrobenzo[b]quinolizine | 25 | 27 |
| 9,10-dimethoxy-7-isopropyl-1,3,4,6,11,11a-hexahydrobenzo[b]quinolizine | 50 | 164 | acid (150 ml.) and water (100 ml.) and exhaustively hydrogenated at atmospheric pressure using platinum oxide (250 mg.) as catalyst. The catalyst was removed by filtration and the filtrate evaporated to dryness. Ether and 10% sodium hydroxide solution were added to the residue which went into solution. The ether was separated, the aqueous phase washed with more ether, and the combined ether solutions dried over anhydrous sodium sulfate and evaporated. Recrystallization from hexane gave 3.14 g. of the pure product, M.P. 62–63°.

*Analysis.*—Calc'd. for $C_{16}H_{23}NO_2$: C, 73.53; H, 8.87; N, 5.36%. Found: C, 73.55; H, 8.83; N, 5.56%.

(b) The 8,9 - dimethoxy-7-methylbenzo[b]quinolizinium bromide used as starting material was prepared according to the method given in Example 12.

EXAMPLE 2

8,9-dihydroxy-7-methyl-1,3,4,6,11,11a-hexahydrobenzo[b]quinolizine hydrobromide (a) A solution of 8,9-dihydroxy-7-methylbenzo[b]quinolizinum bromide (10 g.) in water (500 ml.) and glacial acetic acid (250 ml.) was exhaustively hydrogenated at atmospheric pressure using platinum oxide (300 mg.) as catalyst. The mixture was heated to boiling and the catalyst removed by filtration. The solution was evaporated to dryness on the rotary evaporator and the residue recrystallized once from dilute hydrobromic acid to give 7.8 g. of analytically pure material, M.P. 340° with decomposition.

*Analysis.*—Calc'd. for $C_{14}H_{19}NO_2HBr$: C, 53.52; H, 6.42; N, 4.46%; Br, 25.44%. Found: C, 53.34; H, 6.29; Br, 24.50, 24.49, 25.69; N, 4.47%.

(b) The 8,9 - dihydroxy-7-methylbenzo[b]quinolizinium bromide used as starting material was prepared as follows:

A mixture of 8,9-dimethoxy-7-methylbenzo[b]quinolizinium bromide (5 g.; prepared as described in Example 1b) and 48% hydrobromic acid (20 ml.) was refluxed for 3 hours, and the reaction mixture cooled to room temperature. The product was removed by filtration and recrystallized twice from dilute hydrobromic acid to give 1.4 g. of 8,9-dihydroxy-7-methylbenzo[b]quinolizinium bromide as long yellow needles having a melting point of 305–310° with decomposition.

EXAMPLE 3

7,8-dimethoxy-1,3,4,6,11,11a-hexahydrobenzo[b]quinolizine (a) 7,8 - dimethoxybenzo[b]quinolizinium bromide (19.9 g.) was dissolved in a mixture of water (400 ml.) and glacial acetic acid (600 ml.) and hydrogenated at atmospheric pressure using platinum oxide (1 g.) as catalyst. After uptake of hydrogen had ceased, the catalyst was filtered off and the filtrate removed on the rotary evaporator. The resulting solid was taken up in water and ether and the aqueous phase made strongly basic by the addition of 50% aqueous potassium hydroxide. The ether layer was separated and the aqueous phase extracted with ether (2× 1000 ml.). The combined ether solutions were dried over anhydrous potassium carbonate and the solvent removed under reduced pressure to give 8.28 g. of the crude product. Two recrystallizations from hexane gave 4.12 g. of analytically pure material, M.P. 59–60.5°.

*Analysis.*—Calcd. for $C_{15}H_{21}NO_2$: C, 72.84; H, 8.56; N, 5.66%. Found: C, 73.04; H, 8.26; N, 5.59%.

(b) The 7,8 - dimethoxybenzo[b]quinolizinium bromide used as starting material was prepared as follows:

2,3-dimethoxybenzyl alcohol (75 g.) was dissolved in dry benzene (683 ml.) and the solution cooled with an ice-water bath. The solution was stirred and saturated with hydrogen bromide. The reaction mixture was neutralized with anhydrous potassium carbonate, filtered, dried over anhydrous magnesium sulfate and the solvent removed on the rotary-evaporator to give 90.3 g. of 2,3-dimethoxybenzyl bromide as an oil, used without purification for the next synthetic step.

The crude bromide and 2-pyridinealdoxime (47.9 g.) were dissolved in dimethylformamide (63 ml.) and the resulting solution maintained at 30° for 18 hours. The crystalline product was filtered off and the filtrate poured into ethyl acetate (4000 ml.). The amorphous product was filtered off and combined with the crystalline material to give a total yield of 118.2 g. of 1-(2,3-dimethoxy)benzyl-2-formylpyridinium bromide oxime, used without purification for the next step.

1-(2,3-dimethoxy)benzyl - 2 - formylpyridinium bromide oxime (26.3 g.) was added to 47% hydrobromic acid (65 ml.) at 110° and the mixture maintained at that temperature for 5 minutes. The solution was poured into tetrahydrofuran (1500 ml.) and the mixture was stirred at room temperature for 18 hours. The crystalline product was filtered off (19.9 g.) and used without purification for conversion to the hexahydrobenzo[b]quinolizine.

EXAMPLE 4

9,10-dihydroxy-7-methyl-1,3,4,6,11,11a-hexahydrobenzo[b]quinolizine hydrobromide (a) 9,10-dimethoxy - 7 - methylbenzo[b]quinolizinium bromide (20.4 g.) was dissolved in a mixture of glacial acetic acid (600 ml.) and water (400 ml.) and hydrogenated at atmospheric pressure using platinum oxide (1 g.) as catalyst. The catalyst was filtered off and the solvents evaporated. The residue was worked up with ether and 10% aqueous sodium hydroxide, the ether solution dried over anhydrous potassium carbonate and the solvent removed to give 9.17 g. of crude 9,10-dimethoxy-7-methyl-1,3,4,6,11,11a-hexahydrobenzo[b]quinolizine. This product was recrystallized from hexane to give 6.13 g. of material which was dissolved in 48% hydrobromic acid (26 ml.). The resulting solution was refluxed for 3 hours, and cooled to room temperature. The crystalline product was filtered off and recrystallized from dilute hydrobromic acid to give 4.4 g. of 9,10-dihydroxy-7-methyl-1,3,4,6,11,11a-hexahydrobenzo[b]quinolizine hydrobromide, M.P. 310–314° with decomposition.

*Analysis.*—Calcd. for $C_{14}H_{19}NO_2HBr$: C, 53.51; H, 6.42; N, 4.46; Br, 25.43%. Found: 53.39; H, 6.47; N, 4.46; Br, 25.67%.

(b) The 9,10-dimethoxy-7-methylbenzo[b]quinolizinium bromide used as starting material was prepared as follows:

4-methylcatechol (125 g.) was dissolved in a solution of sodium hydroxide (81 g.) in water (810 ml.). The solution was cooled to −15° with ice/salt and dimethyl sulfate (218 g.) was added to the stirred and cooled reaction mixture during 1½ hours. The mixture was warmed on a steam bath for 2½ hours and refluxed for 18 hours. After cooling, the organic phase was separated and the aqueous phase extracted with benzene (2× 250 ml.). The combined organic solutions were washed with 10% sodium hydroxide solution until no phenolic material remained (ferric chloride test), then with water. The benzene was removed by distillation at atmospheric pressure through a Vigreux column, and the residue distilled under reduced pressure. The yield of 3,4-dimethoxytoluene was 92.2 g. of colorless liquid, B.P. 110°–120°/12 mm.

A mixture of 3,4-dimethoxytoluene (10 g.) of glacial acetic acid (11 g.) and monobromomethylmethylether (17.1 g.; prepared according to example 1b) was maintained at 30° for 5 hours. The reaction mixture was poured into ice-water and the resulting oil was extracted from the water with ether, the ether dried over anhydrous magnesium sulfate and evaporated under reduced pressure to give 4,5-dimethoxy - 2 - methylbenzylbromide (15 g.) as a yellow oil. This material was used without purification for the next synthetic step.

4,5-dimethoxy-2-methylbenzyl bromide (12.52 g.) and 2-pyridine aldoxime (6.26 g.) were dissolved in dimethylformamide (32 ml.) and the resulting solution maintained at 30° for 18 hours. The crystalline product (11.42 g.) was filtered off and the filtrate added slowly to ethyl acetate (500 ml.) which precipitated a further 2.84 g. of amorphous product. The crystalline material, 1-(4,5-dimethoxy - 2 - methyl)benzyl-2-formylpyridinium bromide oxime was used without purification for the next synthetic step.

The crystalline quaternary salt described above (11.42 g.) was dissolved in 47% hydrobromic acid (29 ml.) heated on the steam bath, and the resulting dark orange solution was added slowly to tetrahydrofuran (450 ml.) with stirring. The stirring was continued for a further 18 hours and the resulting crystalline product which was 9,10-dimethoxy-7-methylbenzo[b]quinolizinium bromide (5.18 g.) was filtered off.

EXAMPLE 5

7,8-dihydroxy-1,3,4,6,11,11a-hexahydrobenzo[b]quinolizine hydrobromide

A solution of 7,8-dimethoxy-1,3,4,6,11,11a-hexahydrobenzo[b]quinolizine (9.18 g.; Example 3) in 48% hydrobromic acid (40 ml.) was refluxed for 3 hours and the reaction mixture cooled to room temperature. The crystalline product was filtered off and recrystallized twice from dilute hydrobromic acid to give 1.85 g. of the pure salt, M.P. 283–285°.

Analysis.—Calc'd. for $C_{13}H_{17}NO_2HBr$: C, 52.01; H, 6.05; N, 4.67; Br. 26.62%. Found: C, 51.89; H, 5.99; N, 4.56; Br, 26.45%.

EXAMPLE 6

8,9,10-trimethoxy-1,3,4,6,11,11a-hexahydrobenzo[b]quinolizine (a) 8,9,10-trimethoxybenzo[b]quinolizinium bromide (30.0 g.) was dissolved in a mixture of glacial acetic acid (900 ml.) and water (600 ml.) and hydrogenated at atmospheric pressure using platinum oxide (1.5 g.) as catalyst. After uptake of hydrogen had ceased, the catalyst was filtered off and the filtrate was evaporated. The residue was worked up with ether and 10% aqueous sodium hydroxide, the ether solution dried over anhydrous potassium carbonate and the solvent removed. The residue was crystallized from hexane to give 8.9 g. of the pure product, M.P. 89–91°.

Analysis.—Calc'd. for $C_{16}H_{23}NO_3$: C, 69.28; H, 8.36; N, 5.05%. Found: C, 69.39; H, 8.49; N, 5.15%.

(b) The 8,9,10-trimethoxybenzo[b]quinolizinum bromide used as starting material was prepared as follows:

3,4,5-trimethoxybenzyl alcohol (40 g.) was dissolved in dry benzene (310 ml.) and the solution was cooled with an ice-water bath. The solution was stirred and saturated with hydrogen bromide. The reaction mixture was neutralized with anhydrous potassium carbonate, filtered, dried over anhydrous magnesium sulfate, and the solvent removed on the rotary evaporator to give 43.30 g. of 3,4,5-trimethoxybenzyl bromide, used without purification for the next synthetic step.

The crude bromide obtained above and 2-pyridinealdoxime (32.3 g.) were dissolved in dimethyl formamide (203 ml.) and the solution was maintained at 30° for 18 hours. The crystalline product was filtered off and the filtrate poured into ethyl acetate (2000 ml.). The resulting amorphous material was filtered off and combined with the crystalline material to give a total yield of 51.24 g. of 1-(3,4,5-trimethoxy)benzyl-2-formylpyridinium bromide oxime, used without purification for the next synthetic step.

1 - (3,4,5-trimethoxy)benzyl-2-formylpyridinium bromide oxime (78.2 g.; prepared as described above) was dissolved in 48% hydrobromic acid (200 ml.) previously heated to 110° and the solution was maintained at that temperature for 5 minutes. The solution was poured into tetrahydrofuran (4500 ml.) wtih stirring and the stirring was maintained for a further 18 hours. The 8,9,10-trimethoxybenzo[b]quinolizinium bromide was filtered off (46.8 g.) and used without purification for conversion to the hexahydro compound.

EXAMPLE 7

8,9,10-trihydroxy-1,3,4,6,11,11a-hexahydrobenzo[b]quinolizine

A solution of 8,9,10-trimethoxy-1,3,4,6,11,11a-hexahydrobenzo[b]quinolizine (4.5 g.; Example 6) in 48% hydrobromic acid (34 ml.) was refluxed for 3 hours. The reaction mixture was cooled to room temperature and the crystalline product filtered off. One recrystallization from dilute hydrobromic acid gave 2.5 g. of the pure trihydroxycompound, as the hydrobromide M.P. 299–300.5° with decomposition.

Analysis.—Calc'd. for $C_{13}H_{11}NO_3HBr$: C, 49.38; H, 5.74; N, 4.43; Br, 25.27%. Found: C, 49.48; H, 5.74; N, 4.21; Br, 25.49%.

EXAMPLE 8

9,10-dimethoxy-7-isopropyl-1,3,4,6,11,11a-hexahydrobenzo[b]quinolizine (a) 9,10-dimethoxy-7-isopropylbenzo[b]quinolizinium bromide (31 g.) was dissolved in a mixture of glacial acetic acid (900 ml.) and water (600 ml.) and hydrogenated at atmospheric pressure using platinum oxide (1.5 g.) as catalyst. The catalyst was filtered off and the solvents evaporated. The residue was worked up with ether and 10% aqueous sodium hydroxide, the ether solution was dried over anhydrous potassium carbonate and the solvent removed to give 18.2 g. of the crude product. Two recrystallizations from methanol gave 5.1 g. of the pure material, M.P. 77–78.5°.

Analysis.—Calc'd. for $C_{18}H_{27}NO_2$: C, 74.70; H, 9.40; N, 4.84%. Found: C, 74.64; H, 9.16; N, 4.84%.

(b) The 9,10-dimethoxy-7-isopropylbenzo[b]quinolizinimum bromide used as starting material was prepared as follows:

4-isopropylcatechol (230 g.) was dissolved in a solution of sodium hydroxide (168 g.) in water (1210 ml.). The solution was cooled to 15° with ice/salt, and dimethyl sulfate (325 ml.) was added to the stirred and cooled reaction mixture over a 1½ hour period. The mixture was warmed on the steam bath for 1 hour and refluxed for 18 hours. After cooling, the organic phase was separated and the aqueous phase extracted with benzene (2× 250 ml.). The combined organic solutions were washed with 10% sodium hydroxide solution until no phenolic material remained (ferric chloride test) and then with water. The benzene was removed by distillation at atmospheric pressure through a Vigreux column, and the residue i.e. 3,4-dimethoxycumene distilled under reduced pressure. The yield was 223.1 g. of a pale yellow liquid, B.P. 123–130°/23 mm.

A mixture of 3,4-dimethoxycumene (41.2 g.) glacial acetic acid (38 g.) and of monobromomethylmethyl ether (60 g.; prepared according to Example 1b) was maintained at 30° for 5 hours. The reaction mixture was poured into ice-water, and the resulting oil was extracted from the water with ether, and the ether dried over anhydrous magnesium sulfate and evaporated under reduced pressure to give 4,5-dimethoxy-2-isopropylbenzyl bromide (54.7 g.) as a yellow oil. This material was used without purification for the next synthetic step.

4,5-dimethoxy-2-isopropylbenzyl bromide (54.7 g.) and 2-pyridinealdoxime (20.9 g.) were dissolved in dimethylformamide (132 ml.) and the resulting solution maintained at 30° for 18 hours. The reaction mixture was added slowly to ethyl acetate (3000 ml.) which precipitated 1-(4,5-dimethoxy-2-isopropyl)benzyl-2-formylpyridinium bromide oxime (111 g.). This material was used without purification for the next synthetic step.

43.1 g. of the quaternary salt described above was quickly added to 47% hydrobromic acid (100 ml.) at 110°. The resulting dark red solution was maintained at 110° for 5 minutes and then added slowly with stirring to tetrahydrofuran (4000 ml.). The stirring was continued for a further 18 hours and the resulting crystalline product, i.e. 9,10-dimethoxy-7-isopropylbenzo[b]quinolizinium bromide (17.4 g.) filtered off and used directly for the preparation of the hexahydro compound.

EXAMPLE 9

9,10-dihydroxy-7-isopropyl-1,3,4,6,11,11a-hexahydrobenzo[b]quinolizine hydrobromide A solution of 9,10-dimethoxy-7-isopropyl-1,3,4,6,11,11a-hexahydrobenzo[b]quinolizine (7.5 g., Example 8) in 48% hydrobromic acid (30 ml.) was refluxed for 3 hours. The reaction mixture was cooled to room temperature and the crystalline product filtered off. One recrystallization from dilute hydrobromic acid gave 4.5 g. of the pure substance, M.P. 284.5–286°.

Analysis.—Calcd. for $C_{16}H_{23}NO_2 \cdot HBr$: C, 56.16; H, 7.06; N, 4.09; Br, 23.35%. Found: C, 55.85; H, 7.07; N, 3.88; Br. 23.11%.

EXAMPLE 10

7,10-dimethoxy-1,3,4,6,11,11a-hexahydrobenzo[b]quinolizine (a) 1-(2,5-dimethoxy)benzyl-2-formylpyridinium bromide oxime (150 g.) was dissolved in 48% hydrobromic acid (360 ml.) previously heated to 110°, and the solution was maintained at that temperature for five minutes. The reaction mixture was poured slowly with stirring into ethyl acetate (7.5 liters in two portions) and the stirring continued for 18 hours. The resulting red crystalline solid was filtered off (78.2 g.) and dissolved in a mixture of glacial acetic acid (600 ml.) and water (1200 ml.). Platinum oxide (800 mg.) was added and the solution was hydrogenated at atmospheric pressure until uptake ceased. The catalyst was filtered off and the filtrate evaporated to dryness. The residue was worked up with ether and 10% aqueous sodium hydroxide, the ether solution dried over anhydrous potassium carbonate and the ether removed to give 29.6 g. of the crude product as a red-brown solid. Three recrystallizations from hexane/ether gave 8.9 g. of the pure free base, M.P. 100–101.5°.

Analysis.—Calc'd for $C_{15}H_{21}NO_2$: C, 72.84; H, 8.56; N, 5.66%. Found: C, 72.85; H, 8.75; N, 5.65%.

(b) The 1-(2,5-dimethoxy)benzyl-2-formylpyridinium bromide oxime used as starting material was prepared as follows:

A solution of t-butylamineborane (9.6 g.) in benzene (1100 ml.) was added dropwise with stirring to a solution of 2,5-dimethoxybenzaldehyde (49.8 g.) in benzene (500 ml.). The mixture was refluxed for 30 minutes, cooled, and 3 N HCl (250 ml.) added dropwise. Stirring was continued for a further ½ hour, the benzene layer was collected and the aqueous phase washed with benzene (250 ml.). The combined benzene solutions were dried over anhydrous sodium sulfate and the solvent removed on the rotary evaporator, to give 2,5-dimethoxybenzyl alcohol (36 g.) used without purification for the next synthetic step.

35.8 g. of crude alcohol obtained above was dissolved in dry benzene (328 ml.) and the solution cooled with an ice/salt bath. The solution was stirred and saturated with hydrogen bromide. The solution was neutralized with anhydrous potassium carbonate, filtered, dried over anhydrous magnesium sulfate and the solvent removed on the rotary evaporator to give 2,5-dimethoxybenzyl bromide (43.6 g.) M.P. 68–75°, used without purification for the next synthetic step.

2,5-dimethoxybenzyl bromide (43.5 g.) and 2-pyridinealdoxime (23.1 g.) were dissolved in dimethyl formamide (100 ml.) and the solution maintained at 30° for 18 hours. The resulting crystalline product was filtered off and the filtrate poured into ethyl acetate (2000 ml.). The resulting amorphous product was filtered off and combined with the crystalline material to give 1-(2,5-dimethoxy)benzyl-2-formylpyridinium bromide oxime (48.1 g.) used without purification for conversion to the hexahydrozenzo[b]quinolizine.

EXAMPLE 11

7,10-dihydroxy-1,3,4,6,11,11a-hexahydrobenzo[b]quinolizine hydrobromide

A solution of 7,10-dimethoxy-1,3,4,6,11,11a-hexahydrobenzo[b]quinolizine (3.7 g., Example 10) in 47% hydrobromic acid (25 ml.) was refluxed for three hours. The reaction mixture was allowed to cool to room temperature and the product filtered off and recrystallized twice from dilute hydrobromic acid to give 2.0 g. of the pure product, M.P. 251–4°.

Analysis.—Calc'd. for $C_{13}H_{17}NO_2 \cdot HBr$: C, 52.01; H, 6.05; N, 4.67; Br, 26.62%. Found: C, 52.07; H, 5.96; N, 4.84; Br, 26.67%.

EXAMPLE 12

8,9-dimethoxy-7-methylbenzo[b]quinolizinium bromide (a) A mixture of methanol (945 g.) and 40% aqueous formaldehyde (500 ml.) was cooled to −10° and saturated with hydrogen bromide. The two phases were separated and the lower layer distilled. After a forerun, 242 g. of monobromomethylmethylether, B.P. 86–88°, was collected.

(b) A mixture of 2,3-dimethoxytoluene (80 g.), monobromomethylmethyl ether (137 g.) and glacial acetic acid (88 ml.) was maintained at 30° for 8 hours. The reaction mixture was poured into ice-water and the resulting solid filtered off. Recrystallization from hexane gave 73 g. of 3,4-dimethoxy-2-methylbenzylbromide as colorless platelets; M.P. 66–68°.

Analysis.—Calc'd. for $C_{10}H_{13}BrO_2$: C, 49.00; H, 5.35; Br, 32.39%. Found: C, 48.97; H, 5.40; Br, 32.39%.

(c) 3,4 - dimethoxy-2-methylbenzylbromide (54 g.) and 2-pyridinealdoxime (27 g.) were dissolved in dimethylformamide (162 ml.) and the solution was maintained at 30° for 18 hours. The crystalline product was removed by filtration and the filtrate poured slowly into ethyl acetate (2000 ml.) with stirring. The resulting amorphous solid was filtered off and combined with the crystalline material to give a total yield of 74 g. of the quaternary salt which was used without purification for the next step of the synthesis. Two recrystallizations from methanol gave the pure 1-(3,4-dimethoxy-2-methyl)benzyl - 2 - formylpyridinium oxime as colorless crystals; M.P. 166.5–168°.

Analysis.—Calc'd. for $C_{16}H_{19}BrN_2O_3$: C, 52.32; H, 5.22; N, 7.63; Br, 21.76udFo.n% B -.c
5.22; N, 7.63; Br, 21.76%. Found: C, 52.32; H, 5.22; N, 7.63; Br, 21.49%.

(d) 1 - (3,4 - dimethoxy-2-methyl)benzyl-2-formylpyridinium bromide oxime (50 g.) was dissolved in 48% hydrobromic acid (125 ml.) previously heated to 110° and the solution was maintained at that temperature for 5 minutes. The solution was poured into tetrahydrofuran (2000 ml.) with stirring and the stirring was maintained for a further 18 hours. Filtration gave 28 g. of the product as yellow platelets. Five recrystallizations from ethanol gave 11.5 g. of pure 8,9-dimethoxy-7-methlbenzo[b]quinolizinium bromide M.P. 222.5–224.5°.

Analysis.—Calc'd. for $C_{16}H_{16}BrNO_2$: C, 57.49; H, 4.83; N, 4.18; Br, 23.92%. Found: C, 57.54; H, 4.82; N, 4.26; Br, 23.83%.

What is claimed is:
1. A compound of the formula

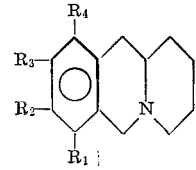

wherein
$R_1$ is hydrogen, lower alkyl, or hydroxy; and
each of $R_2$, $R_3$, and $R_4$ is hydrogen or hydroxy, at least two of $R_1$, $R_2$, $R_3$, and $R_4$ being hydroxy, with the proviso that if $R_1$ is hydrogen, $R_4$ is hydroxy.

2. A compound of the formula

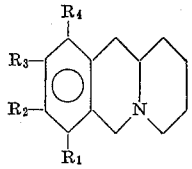

wherein
$R_1$ is hydrogen, methyl, or lower alkoxy; and
each of $R_2$, $R_3$, and $R_4$ is hydrogen or lower alkoxy, at least two of $R_1$, $R_2$, $R_3$ and $R_4$ being adjacent lower alkoxy with the proviso that if $R_1$ is hydrogen, $R_4$ is lower alkoxy.

3. A compound as defined in claim 2, wherein said compound is 8,9-dimethoxy-7-methyl-1,3,4,6,11,11a-hexahydrobenzo[b]quinolizine.

4. A compound as defined in claim 1, wherein said compound is 8,9-dihydroxy-7-methyl-1,3,4,6,11,11a-hexahydrobenzo[b]quinolizine.

5. A compound as defined in claim 2, wherein said compound is 7,8 - dimethoxy - 1,3,4,6,11,11a - hexahydrobenzo[b]quinolizine.

6. A compound as defined in claim 1, wherein said compound is 9,10-dihydroxy-7-methyl-1,3,4,6,11,11a-hexahydrobenzo[b]quinolizine.

7. A compound as defined in claim 1, wherein said compound is 7,8 - dihydroxy - 1,3,4,6,11,11a - hexahydrobenzo[b]quinolizine.

8. A compound as defined in claim 2, wherein said compound is 8,9,10-trimethoxy-1,3,4,6,11,11a-hexahydrobenzo[b]quinolizine.

9. A compound as defined in claim 1, wherein said compound is 8,9,10-trihydroxy-1,3,4,6,11,11a-hexahydrobenzo[b]quinolizine.

10. A compound as defined in claim 1, wherein said compound is 9,10-dihydroxy-7-isopropyl-1,3,4,5,11,11a-hexahydrobenzo[b]quinolizine.

11. A compound as defined in claim 1, wherein said compound is 7,10 - dihydroxy - 1,3,4,6,11,11a-hexahydrobenzo[b]quinolizine.

References Cited

UNITED STATES PATENTS

| | | | |
|---|---|---|---|
| 3,271,396 | 9/1966 | Bernstein et al. | 260—251 |
| 3,336,320 | 8/1967 | Doebel et al. | 260—293 |
| 3,375,253 | 3/1968 | Fields et al. | 260—286 |
| 3,408,352 | 10/1968 | Hardtmann | 260—288 |

OTHER REFERENCES

Kupchan: Jour. Org. Chem., vol. 31, pp. 1713–16 (1966.)

DONALD G. DAVIS, Primary Examiner

U.S. Cl. X.R.

260—286, 287, 294.3, 296, 690, 691; 424—258

UNITED STATES PATENT OFFICE
CERTIFICATE OF CORRECTION

Patent No. 3,484,443  Dated Dec. 16, 1969

Inventor(s) Jeffrey W. H. Watthey and Karl J. Doebel

It is certified that error appears in the above-identified patent and that said Letters Patent are hereby corrected as shown below:

Column 2 line 31 - "$C_mH_2M_{+1}$" should read -- $C_mH_{2m+1}$ --.

Column 2 line 55 - that portion of the formula " $N^{\oplus}_{\ominus} \atop X$ " should read -- $N^{\oplus}_{\phantom{X}} \atop X^{-}$ --.

Column 4 line 5 - that portion of the formula

" Polyphosphoric acid $\longrightarrow$ " should read

-- $\underset{85°}{\text{Polyphosphoric acid}} \longrightarrow$ --.

Column 4 line 35 - " -$\omega$-carboal-" should read -- N-$\omega$-carboal-

Column 5 bottom of page under Percent Control Counts:
"210" should read -- 214 --.
"499" should read -- 490 --.
"123" should read -- 129 --.
"40" should read -- 43 --.
"27" should read -- 20 --.
"164" should read -- 167 --.

Column 11 line 19 - "56.16" should read -- 56.15 --.

Column 12 line 51 should be omitted.

Column 14 Claim 10 "1,3,4,5,11,11a" should read -- 1,3,4,6,11,11a --.

Signed and sealed this 28th day of March 1972.

(SEAL)
Attest:

EDWARD M. FLETCHER, JR.
Attesting Officer

ROBERT GOTTSCHALK
Commissioner of Patents